United States Patent
Yasukawa et al.

(10) Patent No.: US 10,091,829 B2
(45) Date of Patent: Oct. 2, 2018

(54) USER APPARATUS, AND SIGNAL TRANSMISSION AND RECEPTION METHOD

(71) Applicant: NTT DOCOMO, INC., Tokyo (JP)

(72) Inventors: Shimpei Yasukawa, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 6 days.

(21) Appl. No.: 15/126,396

(22) PCT Filed: Mar. 17, 2015

(86) PCT No.: PCT/JP2015/057885
§ 371 (c)(1),
(2) Date: Sep. 15, 2016

(87) PCT Pub. No.: WO2015/141672
PCT Pub. Date: Sep. 24, 2015

(65) Prior Publication Data
US 2017/0094702 A1 Mar. 30, 2017

(30) Foreign Application Priority Data
Mar. 20, 2014 (JP) .................. 2014-059258

(51) Int. Cl.
*H04W 76/14* (2018.01)
*H04W 76/23* (2018.01)
*H04W 72/04* (2009.01)
*H04W 76/11* (2018.01)
*H04W 76/02* (2009.01)

(52) U.S. Cl.
CPC ....... *H04W 76/14* (2018.02); *H04W 72/0406* (2013.01); *H04W 76/021* (2013.01); *H04W 76/023* (2013.01); *H04W 76/11* (2018.02)

(58) Field of Classification Search
None
See application file for complete search history.

(56) References Cited

FOREIGN PATENT DOCUMENTS

| JP | 2013034165 A | 2/2013 |
| WO | 2015142250 A1 | 9/2015 |

OTHER PUBLICATIONS

Office Action issued in the counterpart Japanese Patent Application No. 2014-059258, dated Apr. 11, 2017 (5 pages).
BlackBerry UK Limited; "D2D Proximity Requirements and Identity Mechanisms"; 3GPP TSG-RAN WG1 #74, R1-133535; Barcelona, Spain; Aug. 19-23, 2013 (3 pages).
Extended European Search Report issued in the counterpart European Patent Application No. 15764875.9, dated Nov. 29, 2016 (13 pages).

(Continued)

*Primary Examiner* — Diane Lo
(74) *Attorney, Agent, or Firm* — Osha Liang LLP

(57) ABSTRACT

A user apparatus that performs D2D communication by radio includes a signal transmission unit configured to transmit a signal including a destination identifier of a physical layer associated with a destination identifier of an upper layer which is a layer higher than the physical layer; and a signal reception unit configured to detect a signal addressed to the user apparatus by detecting an identifier, of the physical layer of the user apparatus, that is associated with an identifier of the upper layer of the user apparatus from a signal received by radio.

16 Claims, 11 Drawing Sheets

(56) References Cited

OTHER PUBLICATIONS

Ericsson; "Identifiers and Addresses for D2D Communication"; 3GPP TSG-RAN WG2 #85bis, Tdoc R2-141262; Valencia, Spain; Mar. 31-Apr. 4, 2014 (12 pages).
Office Action issued in corresponding Japanese Application No. 2014-059258, dated Jan. 4, 2017 (6 pages).
International Search Report issued in corresponding application No. PCT/JP2015/057885 dated Jun. 16, 2015 (3 pages).
Written Opinion of the International Searching Authority issued in corresponding application No. PCT/JP2015/057885 dated Jun. 16, 2015 (3 pages).
Ericsson, "D2D communication addressing"; 3GPP TSG-RAN WG2 #85, Tdoc R2-140623; Prague, Czech Republic; Feb. 10-14, 2014 (6 pages).
CATT, "Message flow for D2D discovery"; 3GPP TSG RAN WG2 Meeting #84, R2-134063; San Francisco, USA; Nov. 11-15, 2013 (4 pages).
Office Action issued in corresponding Japanese Patent Application No. 2017-150186, dated May 22, 2018 (4 pages).
Office Action issued in corresponding European Patent Application No. 15764875.9, dated May 24, 2018 (4 pages).
Office Action issued in corresponding Japanese Patent Application No. 2017-150187, dated May 29, 2018 (4 pages).
LG Electronics, "D2D Communication Physical Channel Design", 3GPP TSG RAN WG1 Meeting #75, R1-135480, San Francisco, USA, Nov. 11-15, 2013 (8 pages).

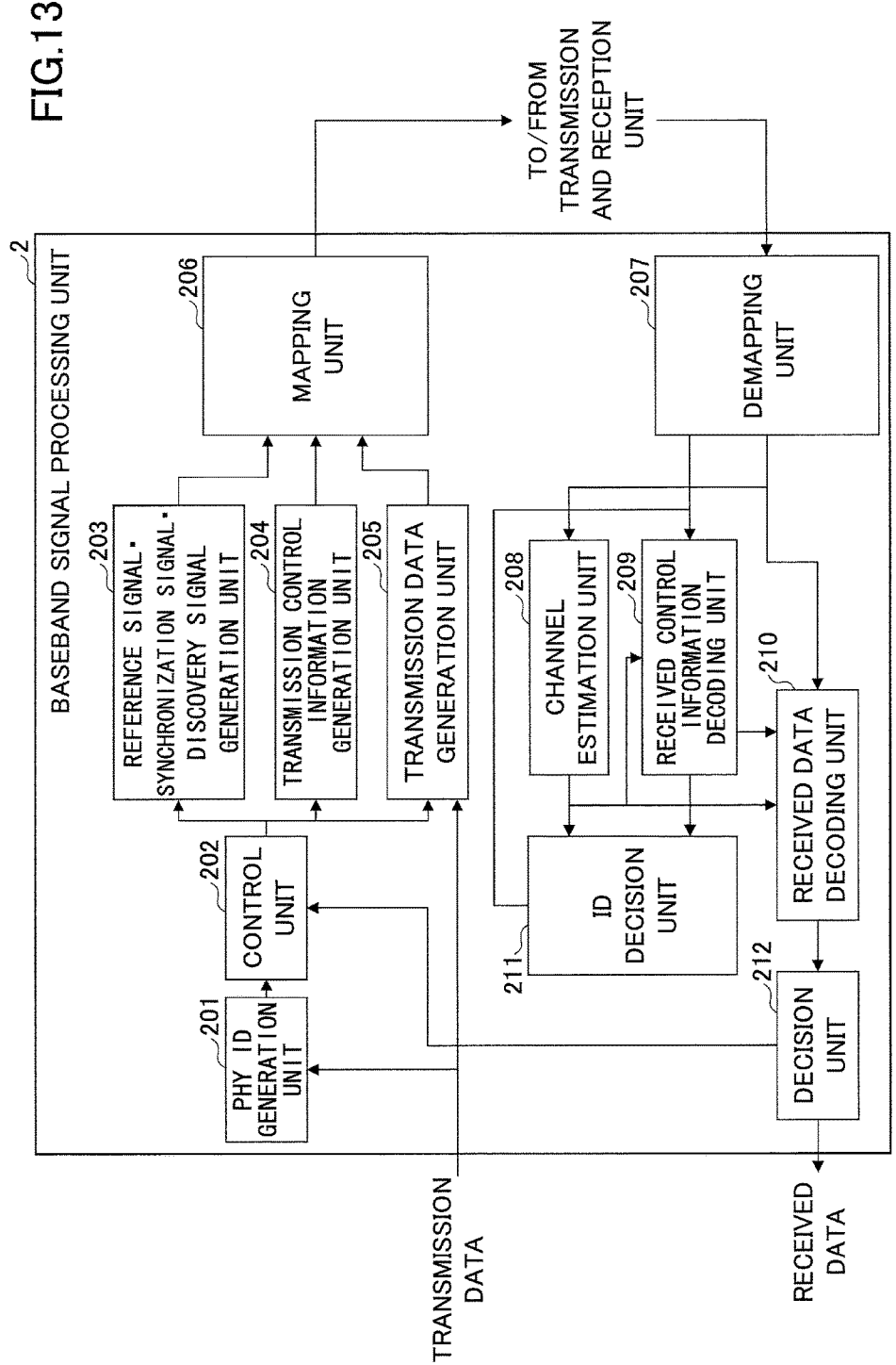

USER APPARATUS, AND SIGNAL TRANSMISSION AND RECEPTION METHOD

TECHNICAL FIELD

The present invention relates to terminal-to-terminal (D2D) communication. More particularly, the present invention relates to a technique for a terminal (to be referred to as a user apparatus UE hereinafter) to detect a signal addressed to the terminal.

BACKGROUND ART

In mobile communications, it is common that a user apparatus UE and a base station eNB perform communication so that communication is performed between user apparatuses UE. However, in recent years, various techniques on D2D communication (to be also referred to as device-to-device communication) are being considered for performing direct communication between user apparatuses UE using radio interfaces of LTE.

In the D2D communication technique, the user apparatus UE performs direct communication between user apparatuses UE using a radio resource (a time·frequency resource) used for LTE communication. As D2D communications, for example, there is a communication in which, a user apparatus UE transmits (broadcasts) a discovery signal (discovery signal) including identification information of the user apparatus UE itself, so that another user apparatus UE discovers the user apparatus UE of a communication partner by receiving the discovery signal, and the like.

In a case where the user apparatus UE is within a coverage of a base station eNB, a radio resource used for D2D communication by the user apparatus UE is assigned to the user apparatus UE, for example, as a resource pool for D2D communication from the base station eNB. According to such an assignment, it is possible that cellular communication and D2D communication coexist. In addition, it is being studied to enable D2D communication even when the user apparatus UE is out of coverage of the base station eNB.

RELATED ART DOCUMENT

Patent Document

[PATENT DOCUMENT 1] JP2013-034165

SUMMARY OF THE INVENTION

In cellular communication, the user apparatus UE receives various signals by radio from the base station eNB. The signal transmitted to the user apparatus UE from the base station eNB includes an identifier (to be referred to as ID, hereinafter) of the user apparatus UE, so that the user apparatus UE detects a signal addressed to the user apparatus UE itself by the ID. As an example of such an ID, there is RNTI and the like that is assigned from the base station eNB to the user apparatus UE. It can be called "filtering" to receive a signal that should be received by distinguishing the signal from another signal by using the ID.

Also in D2D communication, it is necessary to give an ID to a D2D signal such that the user apparatus UE can detect a signal that the user apparatus UE should receive. However, as described before, when it is assumed to perform D2D communication even in an out-of-coverage area, it is desirable that the ID is not an ID set from the base station eNB.

The radio interface protocol between the base station eNB and the user apparatus UE in LTE is formed by PHY which is layer 1, and by layer 2 including MAC, RLC and PDCP. Also in D2D communication, it is being considered to use radio interface protocols similar to these. Here, PHY is a physical layer, which performs processing such as modulation of radio frequency carrier and coding for radio signal transmission. In layer 2, for example, retransmission control and the like is performed.

Currently, in D2D communication, it is being studied to support an ID for filtering a signal of a reception target in each of PHY and MAC. That is, it is being studied to give an ID to both of a PHY packet and a MAC packet. However, it is considered that an overhead amount increases since the ID is transmitted by each of PHY and MAC. In order to suppress such an increase of the overhead amount, for example, it can be considered to transmit only an ID of MAC.

However, in a case where only the ID of MAC is transmitted, a user apparatus UE of a reception side cannot know whether the MAC packet is addressed to the user apparatus UE itself unless the user apparatus UE obtains the MAC header by performing modulation and decoding of PHY data. Thus, power consumption amount increases so that it is inefficient. In order to solve such inefficiency, it is necessary to transmit a PHY ID together with an MAC ID. But, in such a case, as described before, the overhead amount increases.

In contrast, one or more embodiments of the present invention provide a technique to enable a user apparatus to efficiently detect a signal addressed to the user apparatus itself while suppressing an overhead amount in D2D communication.

According to one or more embodiments of the present invention, there is provided a user apparatus that performs D2D communication by radio, including:

a signal transmission unit configured to transmit a signal including a destination identifier of a physical layer associated with a destination identifier of an upper layer which is a layer higher than the physical layer; and a signal reception unit configured to detect a signal addressed to the user apparatus by detecting an identifier, of the physical layer of the user apparatus, that is associated with an identifier of the upper layer of the user apparatus from a signal received by radio.

According to one or more embodiments of the present invention, there is provided a signal transmission and reception method executed between user apparatuses that perform D2D communication by radio, including:

a signal transmission step in which a transmission side user apparatus transmits a signal including an identifier, of a reception side user apparatus of a physical layer, associated with an identifier of the reception side user apparatus of an upper layer which is a layer higher than the physical layer; and a signal reception step in which the reception side user apparatus detects a signal addressed to the reception side user apparatus by detecting the identifier, of the physical layer of the reception side user apparatus, from a signal received by radio.

According to one or more embodiments of the present invention, a technique can be provided to enable a user apparatus to efficiently detect a signal addressed to the user apparatus itself while suppressing an overhead amount in D2D communication.

BRIEF DESCRIPTION OF THE DRAWINGS

FIG. 13 is a block diagram of a baseband signal processing unit 2.

EMBODIMENTS FOR CARRYING OUT THE INVENTION

In the following, one or more embodiments of the present invention are described with reference to figures. The embodiments described below are merely examples, and the embodiments to which the present invention is applied is not limited to the embodiments below. Although it is assumed that the user apparatus UE and the base station eNB include functions complying with LTE (including LTE-Advanced, or schemes after LTE-Advanced, the same applied hereinafter), the communication scheme that the present invention can apply is not limited to LTE, and the present invention can be applied to other communication schemes. Also, in the embodiments below, it is assumed that "upper layer" is "MAC layer". However, it is only necessary that "upper layer" is a layer higher than the PHY layer, and is not limited to "MAC layer."

(About System Configuration, and Radio Resources for D2D Communication)

Figure 1:
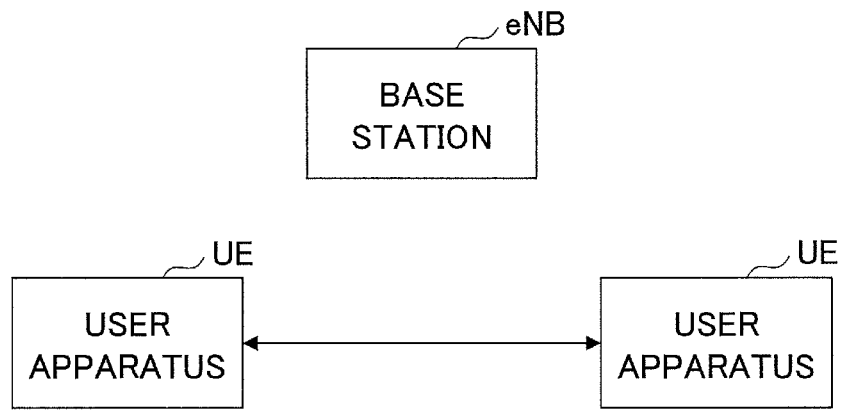
FIG. 1 is a block diagram of a system according to one or more embodiments of the present invention.

FIG. 1 shows a system configuration example in one or more embodiments of the present invention. As shown in FIG. 1, there are a plurality of user apparatuses UE in the communication system according to one or more embodiments, and the communication system is configured to perform D2D communication between user apparatuses UE. In FIG. 1, as an example, a configuration having two user apparatuses UE is shown. Also, according to one or more embodiments, each user apparatus UE can perform normal cellular communication in addition to D2D communication when it is within a coverage of the base station eNB.

The user apparatus UE according to one or more embodiments performs D2D communication using a radio resource for D2D communication that is assigned from the base station eNB when the user apparatus UE is in the coverage, for example. Alternatively, the user apparatus UE performs D2D communication using a predetermined radio resource for D2D communication.

Figure 2:
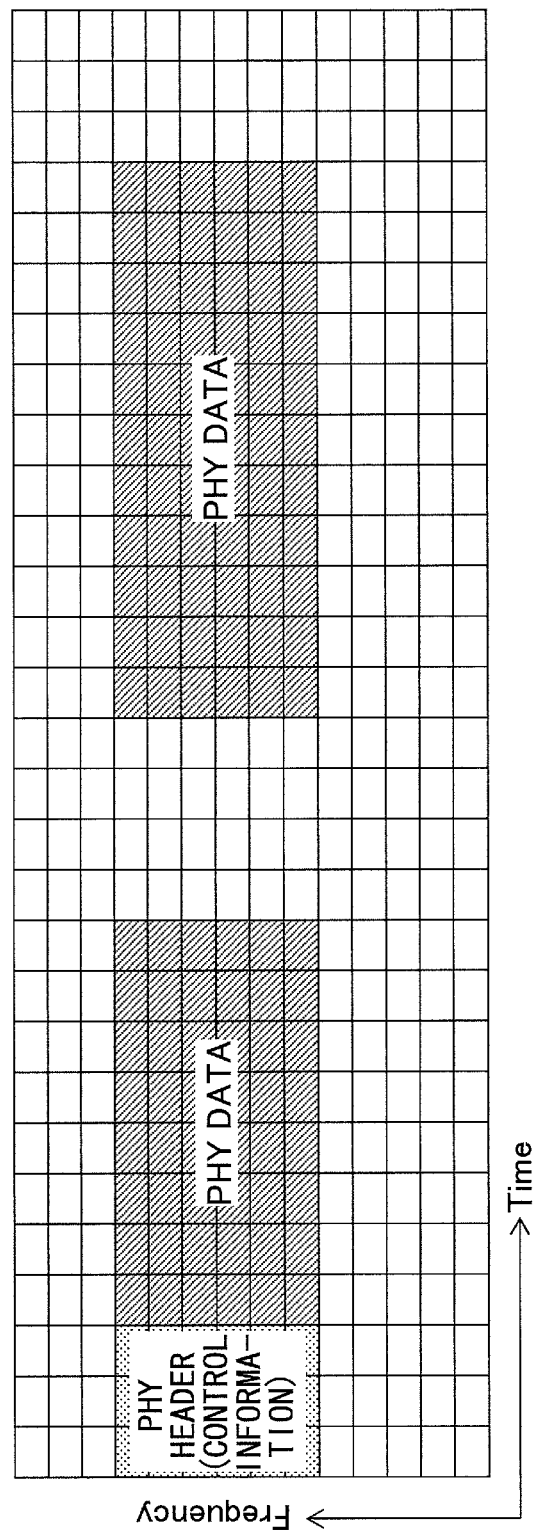
FIG. 2 is a diagram showing an example of a radio resource used for D2D communication.

FIG. 2 shows an example of a radio resource used for D2D communication according one or more embodiments. The radio resource may be referred to as a D2D resource pool. As shown in FIG. 2, as a radio resource used for D2D communication, a configuration can be adopted in which an area (header area) of control information and an area of data are defined so that orthogonal radio resources are assigned to control information and data respectively. Also, radio resource assignment may be adopted in which the area of the control information and the area of data are not distinguished from each other.

Although "control information" is data in general, when "control information" and "data" are used distinctively, "data" is information that the user apparatus UE desires to transmit and receive (information to be transmitted and received by an application, for example), and "control information" is information necessary for receiving "data", for example. "Control information" may be referred to as a header, and "data" may be referred to as a payload. Also, "control information" and "data" can be collectively called "signal".

Also, it is not necessary that the radio resource used for D2D communication is a block of resources in which REs (resource elements), each having a predetermined length in the time direction and the frequency direction, are contiguously placed, as shown in FIG. 2. For example, it may be radio resources in which subframes or subcarriers are assigned in a distributed manner.

As a radio resource for D2D communication, resources of a data channel defined for cellular communication can be used. The data channel is, for example, a data channel and the like used in PUSCH or PDSCH of LTE, or 5G.

(About Signal Transmission and Reception Method and the Like)

Figure 3:
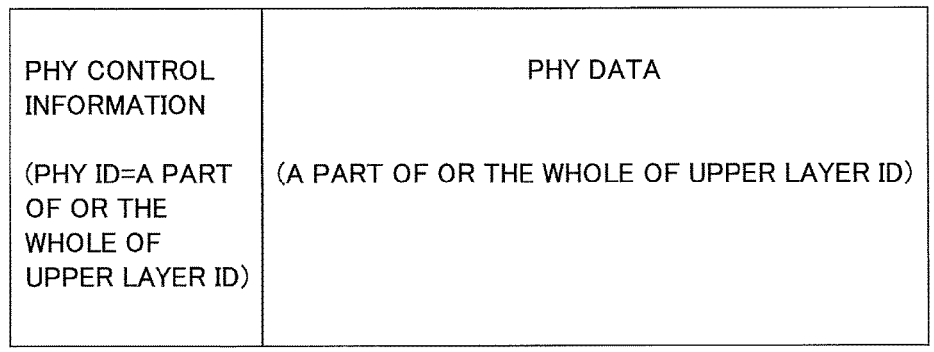
FIG. 3 is a diagram showing a mapping example of PHY control information and upper layer header information according to one or more embodiments.

Next, a transmission method/a reception method of a signal according to one or more embodiments are described. FIG. 3 is a diagram showing a mapping example of PHY control information and PHY data to radio resources for D2D communication according to one or more embodiments.

In the example shown in FIG. 3, PHY control information is mapped to a predetermined header area, and PHY data is mapped to a data area. That is, a bit field to be transmitted as a header area of PHY maps PHY control information according to a predefined format.

In the example shown in FIG. 3, PHY control information includes a PHY ID. As described in more detail later, the PHY ID may be the whole of or a part of an upper layer ID. Also, the PHY ID may be an ID generated by a hash function and the like from an upper layer ID.

Also, according to one or more embodiments, PHY control information and PHY data are encoded independently, and the number of REs (resource elements) used for PHY control information, location of the REs and the like are predetermined. A plurality of candidates of these may exist. Also, MCS (modulation and coding scheme) for PHY control information transmission is determined beforehand.

As to PHY data, the number of REs may be variable or may be fixed. Scheduling information (time-frequency, spread code, and the like) of PHY data can be notified by using PHY control information of the header area, or by a resource position of the header area or by a combination of these.

By using the above-mentioned mapping configuration, the user apparatus UE receives PHY control information addressed to the user apparatus UE itself first by performing blind search and the like within a predetermined range, to be able to determine whether to read PHY data addressed to the user apparatus UE. Thus, reception can be performed without increasing power consumption.

Also, by using the PHY ID as the whole of or a part of an upper layer ID, it becomes unnecessary to transmit all IDs independently for PHY and the upper layer, so that overhead can be decreased.

Figure 4:
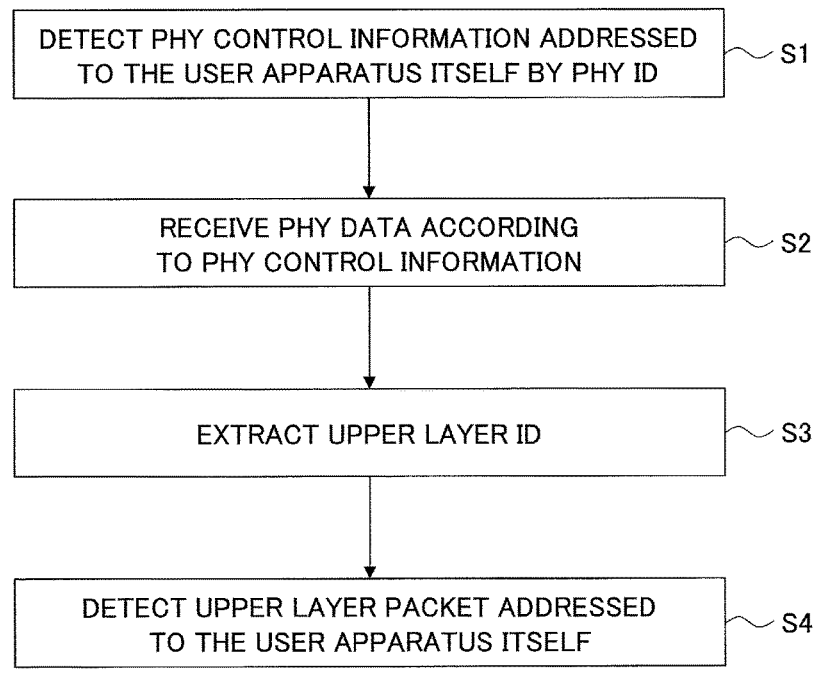
FIG. 4 is a flowchart showing a reception operation example of a user apparatus UE.

With reference to a flowchart of FIG. 4, a reception operation example of the user apparatus UE is described in a case where the above-mentioned mapping configuration of PHY control information and PHY data is adopted. The user apparatus UE receives a radio signal of a header area, and checks whether a PHY ID of the user apparatus UE exists in the PHY control information, and when there is the PHY ID of the user apparatus UE itself, the user apparatus UE determines that the PHY control information is addressed to the user apparatus UE itself (step 1).

The user apparatus UE confirms a reception method (resource, MCS and the like) of PHY data addressed to the user apparatus UE itself by checking content of the PHY control information addressed to the user apparatus UE, and receives (demodulates, decodes) PHY data according to the reception method (step 2). For example, the user apparatus UE extracts an upper layer ID from the PHY ID (example: a part of the upper layer ID) and "a part of the upper layer ID" extracted from PHY data (step 3) to detect an upper layer packet addressed to the user apparatus UE itself (step 4).

(PHY ID Generation Method 1 from Upper Layer ID)

As described before, according to one or more embodiments, the user apparatus UE may generate a PHY ID from an upper layer ID. According to one or more embodiments, as methods for generating a PHY ID from an upper layer ID, there are generation methods 1 and 2. First, the generation method 1 is described. By the way, the generation method 1 and the generation method 2 can be used by combining them.

Figure 5:
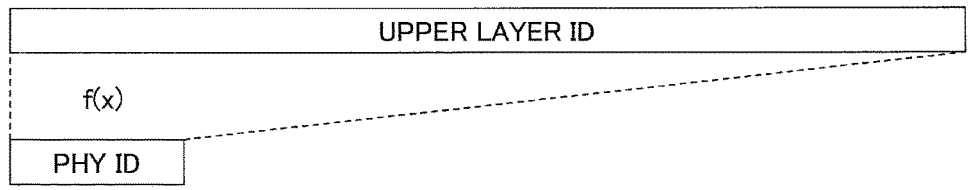
FIG. 5 is a diagram for explaining a method example 1 for generating a PHY ID from an upper layer ID.

In the generation method 1, as shown in FIG. 5, for example, a PHY ID is generated by applying a function f(x) to the upper layer ID. In the example of FIG. 5, a PHY ID is generated as data of a bit length shorter than a bit length of the upper layer ID.

As f(x), a hash function can be used. However, f(x) is not limited to a hash function. As f(x), y=x may be used. In this case, an upper layer ID is used as a PHY ID as it is.

When the PHY ID becomes shorter than the upper layer ID, collision between PHY IDs may occur. Considering such a thing, a plurality of f(x)s may be defined so that the user apparatus UE may arbitrarily select one. For example, in a case where the user apparatus UE transmits PHY data using a PHY ID calculated by using a f(x) from a destination upper layer ID, but detects collision of the PHY ID due to failure of the transmission and the like, the user apparatus UE performs operation to calculate a PHY ID by using another f(x). Accordingly, collision of PHY ID between user apparatuses UE can be avoided. By the way, it is merely an example to define a plurality of f(x)s, and only one f(x) may be defined.

Figure 6:
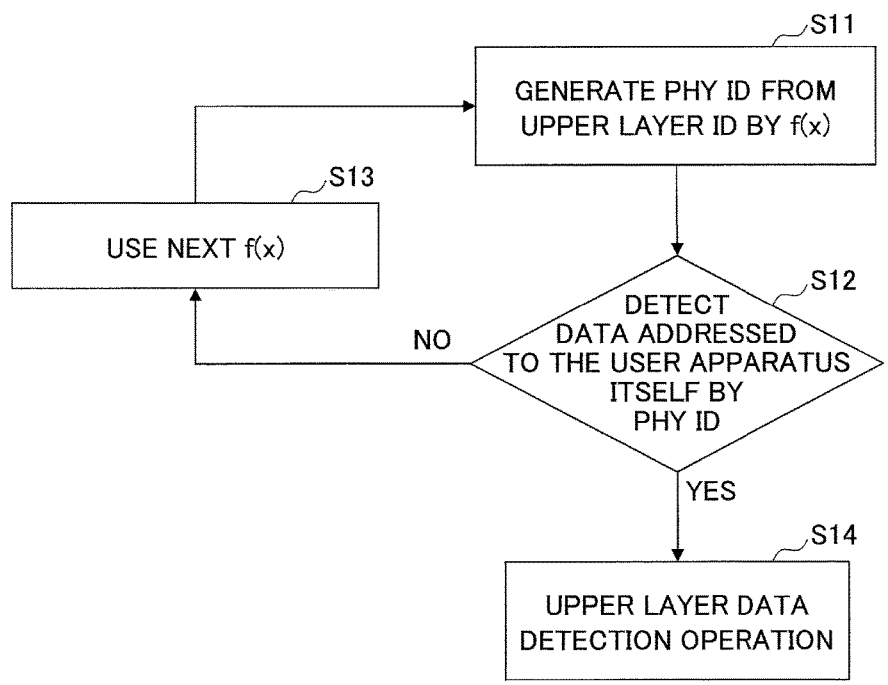
FIG. 6 is a flowchart showing a reception operation example in a case where a plurality of hash functions are used.

In a case where a plurality of f(x)s are defined, each user apparatus UE holds these f(x)s. FIG. 6 is a diagram showing an operation example when a user apparatus UE in a receiving side receives PHY data addressed to the user apparatus UE itself in a case where a plurality of f(x)s are defined.

First, the user apparatus UE generates a PHY ID from an upper layer ID of the user apparatus UE by using an f(x) from among the plurality of f(x) (step 11). The user apparatus UE performs reception operation of PHY data addressed to the user apparatus UE by using the PHY ID. When PHY data cannot be received (No in step 12), the user apparatus UE repeats operation from step 11 by using next f(x) (step 13). Also, when PHY data can be received (Yes in step 12), the user apparatus UE performs detection (reception) operation of the upper layer data addressed to the user apparatus UE itself by using the upper layer ID (step 14).

By the way, in a case where a plurality of f(x)s are defined, a part of or the whole of the upper layer ID may be associated with a specific f(x), so that a part of or the whole of the upper layer ID can be implicitly notified by transmitting the PHY ID. In reception operation of this case, information of f(x) used when reception of PHY data succeeds is used as a part of a reception upper layer ID.

(PHY ID Generation Method 2 from Upper Layer ID)

Next, a PHY ID generation method 2 from an upper layer ID (generation method 2, hereinafter) is described. In the generation method 1, the hash function is used for the whole upper layer ID. On the other hand, in the generation method 2, the upper layer ID is segmented, so that a PHY ID is generated by using a conversion method (hash function and the like) which is different for each segment of the segmented upper layer ID.

For example, in a case where a region code is included in the upper layer ID, the bit area of the region code is made a segment, and when a PHY ID is generated from the upper layer ID, the segment is omitted (deleted) or shortened. Since the probability is low in which user apparatuses UE having upper layer IDs of different region codes coexist in the same area which is a range of D2D communication, the probability of occurrence of collision is low even when the PHY ID is generated by omitting or shortening the segment.

The region code is an example. Other than the region code, a segment of information which is common or which has small difference between user apparatuses UE in a range of D2D communication can be omitted or shortened preferentially. The probability of occurrence of collision is low even when such a segment is omitted or shortened.

Also, a PHY ID may be provided with information which is not included in the upper layer ID. In the generation method 1, it is an example of providing with information which is not included in the upper layer ID to have a plurality of f(x)s. The user apparatus UE may select the additional information autonomously, or the base station eNB may notify of it by an upper layer signaling (for example, RRC signaling).

Like the case of the before-mentioned plurality of f(x)s, a plurality of types of additional information may be defined. In a case where the user apparatus UE transmits PHY control information using a PHY ID obtained by adding additional information to a value generated from an upper layer ID, but detects collision of the PHY ID, the user apparatus UE performs operation to generate a PHY ID by using different additional information. Accordingly, collision of PHY ID between user apparatuses UE can be avoided. Also in the reception side, like the case of f(x), the user apparatus UE performs reception operation by generating a PHY ID by using, one-by-one, the plurality of types of additional information. Also, like the case of the plurality of f(x)s, additional information which was applied when reception succeeded can be used as the whole of or a part of an upper layer ID.

Figure 7:
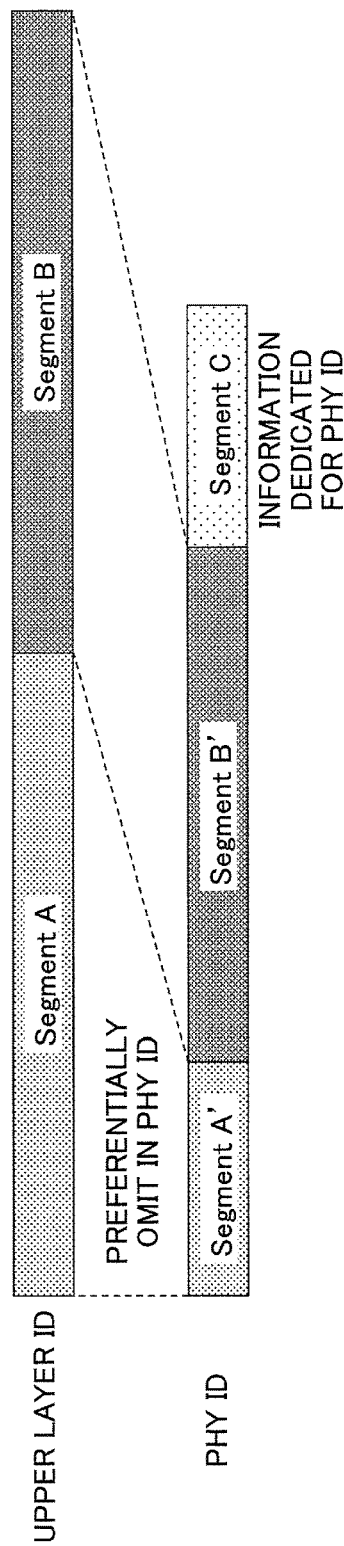
FIG. 7 is a diagram for explaining a method example 2 for generating a PHY ID from an upper layer ID.

FIG. 7 shows an example of the generation method 2. As shown in FIG. 7, for example, the upper layer ID is segmented to segments A and B. The segment A is the above-mentioned region code, for example, so that the segment A is shortened when generating a PHY ID. Also, in the example of FIG. 7, as the above-mentioned additional information, a segment C is added to information (segment A'+segment B') generated from the upper layer ID.

<Defining Method of Upper Layer ID>

Here, a defining method of an upper layer ID is described. According to one or more embodiments, the defining method of the upper layer ID is not limited to a particular method. However, for example, as described above, the upper layer ID can be defined by dividing a bit space used for the upper layer ID into a plurality of segments.

Segment division can be performed based on, for example, region (country and the like), vendor, global/private, broadcast/multicast/unicast, coverage, operator, band, and other arbitrary ID and the like, such as transmission source, transmission destination, communication group and the like. By not enabling arbitrary setting of the whole upper layer ID, collision of ID can be avoided.

Also, by defining the segment such that the more important the usage is, the larger the bit distance from another ID becomes, false alarm can be avoided. For example, by assigning Public safety: 000, Commercial: 111, Public non-safety: 101 Private human type: 110, Private machine type: 011 to a field of 3 bits, Public safety which is highly important can be always separated from another ID by equal to or more than 2 bits.

(Upper Layer ID and PHY ID)

According to one or more embodiments, the user apparatus UE of the transmission side, may transmit the whole of the upper layer ID as PHY data separately from PHY ID, or may not transmit an upper layer ID by generating and transmitting only a PHY ID by setting the whole of the upper layer ID to be common to the PHY ID. Also, a PHY ID may be generated by setting a part of the upper layer ID to be common to the PHY ID, so that the PHY ID and a part of the upper layer ID may be transmitted.

Figure 8:
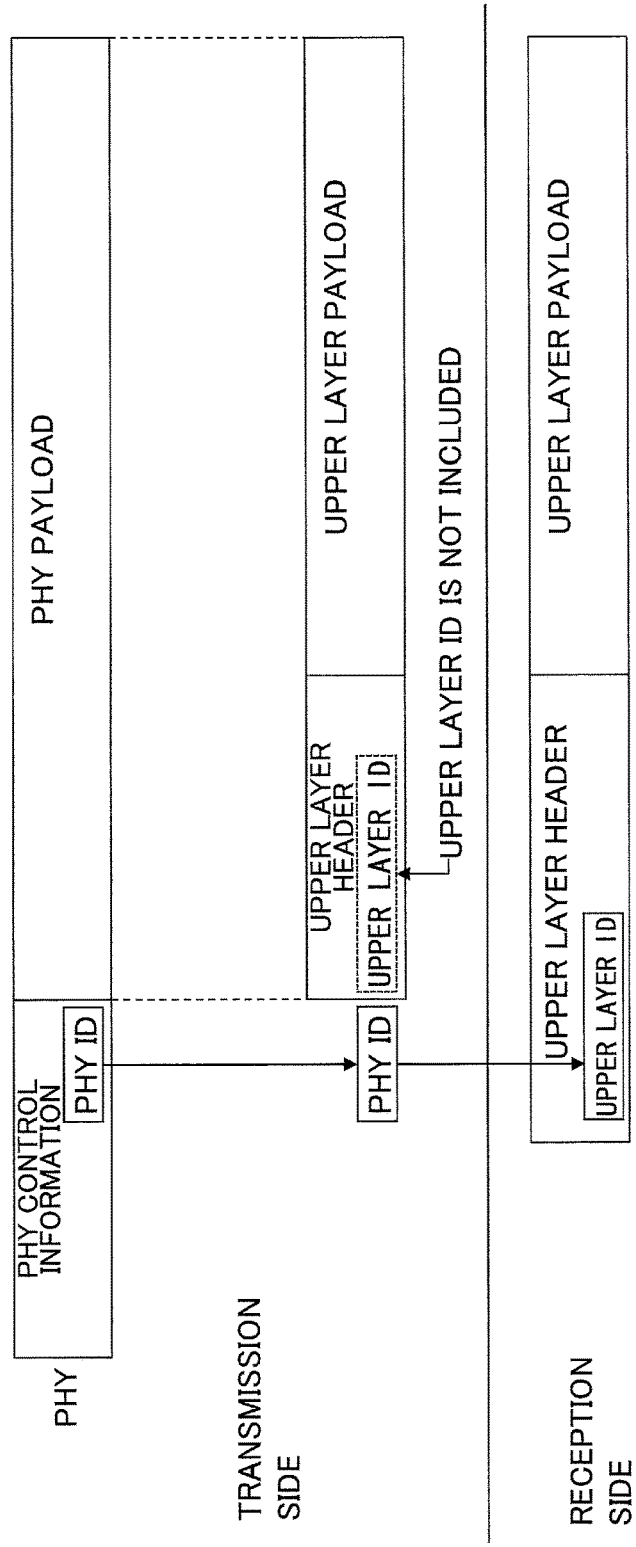
FIG. 8 is a diagram showing a packet configuration example in a case where an upper layer ID is used as a PHY ID.

With reference to FIG. 8, an operation example of transmission and reception of a packet is described with reference to FIG. 8 in a case where the whole of the upper layer ID is used as a PHY ID (that is, PHY ID is also used as an upper layer ID).

In the transmission side of FIG. 8, the user apparatus UE transmits a PHY packet that includes PHY control information having a destination PHY ID and a PHY payload. In the present example, the PHY ID is also used as an upper layer ID, an upper layer packet is transmitted without including an upper layer ID in a header of the upper layer packet.

When the user apparatus UE in the reception side detects a PHY ID of the user apparatus UE itself in signal reception, the user apparatus UE passes the PHY ID to a processing unit of an upper layer as an upper layer ID. Then, the processing unit of the upper layer determines that the upper layer ID of the received upper layer packet is the above-mentioned PHY ID (upper layer ID of the user apparatus UE itself), and determines that the upper layer packet is a packet addressed to the user apparatus UE itself. That is, by using a PHY ID of PHY control information that is not used for upper layer reception processing under normal circumstances, reconfiguration of the upper layer packet is performed.

Figure 9:
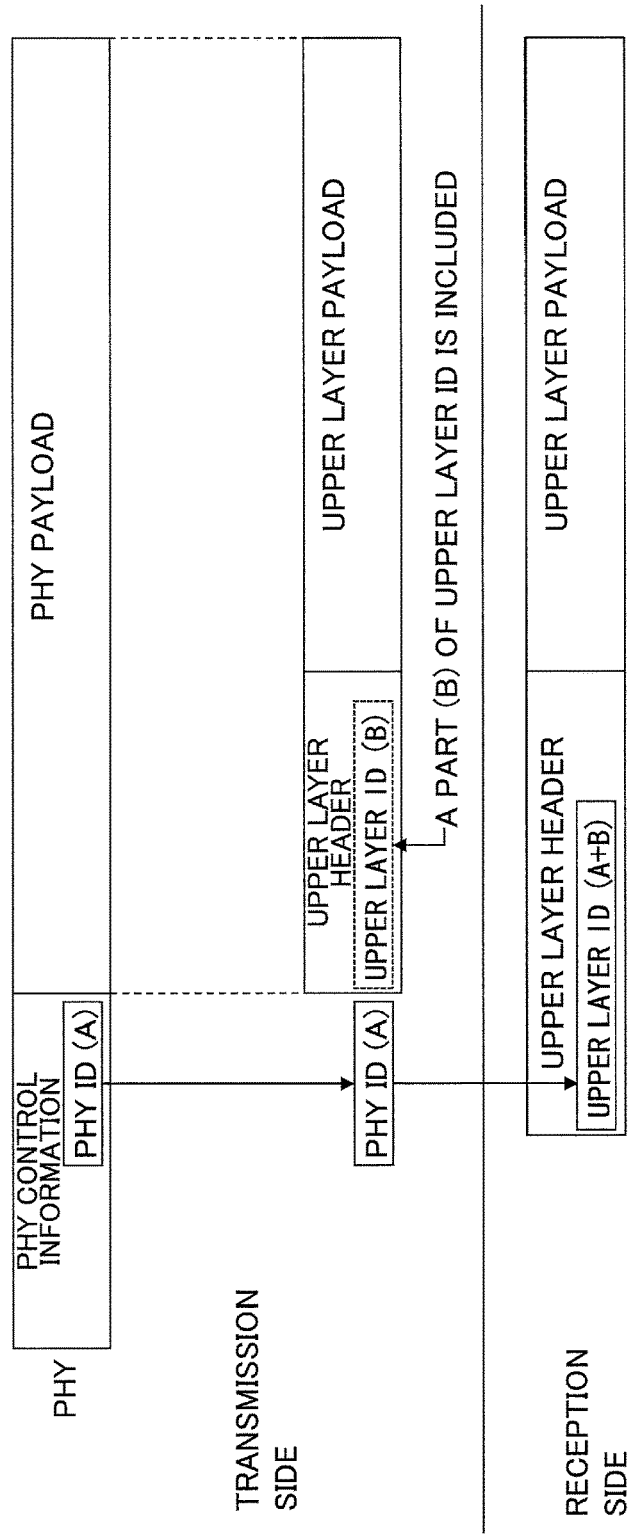
FIG. 9 is a diagram showing a packet configuration example in a case where a part of an upper layer ID is used as a PHY ID.

An operation example of transmission and reception of a packet is described with reference to FIG. 9 in a case where a part of the upper layer ID is used as a PHY ID (that is, PHY ID is also used as a part of an upper layer ID). In the example of FIG. 9, it is assumed that the upper layer ID is "A+B", in which "A" is a PHY ID.

In the transmission side of FIG. 9, the user apparatus UE transmits a PHY packet including PHY control information having a destination PHY ID (A) and a PHY payload. In this example, since the PHY ID (A) is also used as a part of the upper layer ID, the user apparatus UE transmits an upper layer packet including B of the upper layer ID having A+B in the header of the upper layer packet.

When the user apparatus UE in the reception side detects a PHY ID of the user apparatus UE itself in signal reception, the user apparatus UE passes the PHY ID (A) to the processing unit of the upper layer as a part of the upper layer ID. Then, the processing unit of the upper layer detects an upper layer ID from this "A" and the received "B" to determine that an upper layer packet addressed to the user apparatus UE itself is received.

The above-mentioned packet filtering/header reconfiguration based on a subset of the upper layer ID in the lower layer can be applied to a case where a lower layer other than PHY is used.

PHY ID Mapping Method Example 1

Figure 10:
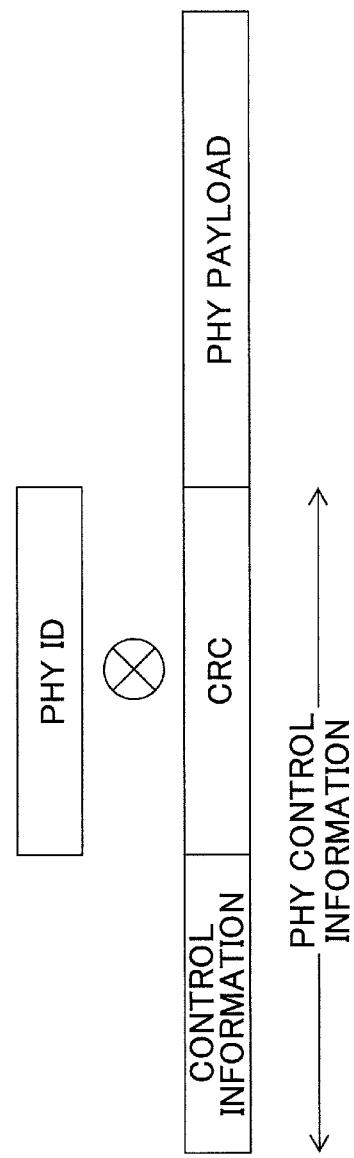
FIG. 10 is a diagram showing a mapping example 1 (there is masking) of a PHY ID to a radio resource.
Figure 11:
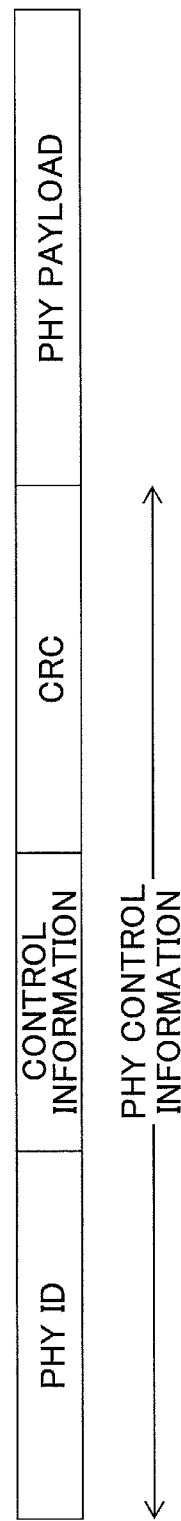
FIG. 11 is a diagram showing a mapping example 2 (no masking) of a PHY ID to a radio resource.

According to one or more embodiments, although the method in which the user apparatus UE includes a destination PHY ID into PHY control information is not limited to a particular method, it is possible to transmit a PHY ID as a part of PHY control information by masking CRC and PHY ID by XOR calculation between CRC and PHY ID of the PHY control information. That is, for example, as shown in FIG. 10, the PHY control information includes control information and CRC of the control information, in which XOR of PHY ID is applied to CRC. The user apparatus UE of the reception side obtains CRC using a PHY ID of the user apparatus UE itself. Then, when CRC check succeeds, the user apparatus UE can receive PHY data addressed to the user apparatus UE itself. Also, as shown in FIG. 11, masking may not be performed by adding a PHY ID as PHY control information. However, it is possible to eliminate overhead by performing masking with CRC as shown in FIG. 10.

PHY ID Mapping Example 2

In the example described so far, a PHY ID is mapped to a part of resources of a data channel (example: PUSCH). On the other hand, the PHY ID may be mapped to a reference signal to transmit it. Also, the PHY ID may be mapped to a synchronization signal of D2D, or to a discovery signal to transmit it. Accordingly, overhead necessary for PHY ID can be decreased. In the following description, the reference signal is taken as an example. However, the synchronization signal and the discovery signal can be similarly applied.

Although the method for mapping the PHY ID to the reference signal is not limited to a specific method, for example, a sequence of the reference signal is associated with (the whole of or a part of) the PHY ID, so that the sequence is transmitted. In the reception side, reception of the PHY ID associated with the sequence is identified by receiving the sequence. Also, for example, a position of a radio resource used for transmitting the reference signal is associated with (the whole of or a part of) the PHY ID, and the reference signal is transmitted. In the reception side, the received PHY ID is identified by the radio resource in which the reference signal is received.

As a concrete example, for example, by using a reference signal similar to DM-RS, the PHY ID or a part of the PHY ID can be notified implicitly by a Zadoff-Chu sequence which is used and the Cyclic shift or OCC.

That is, in DM-RS, it is possible to transmit information of 8 bits for identifying a cell by Sequence group, Hopping (group hopping, sequence hopping) and the like. Such an information notification method can be utilized for PHY ID notification in D2D communication.

Also, by selecting from among 8 (3 bits) Cyclic shifts (Rel.8) or combinations of 8 Cyclic shifts and OCC (Rel.10), the whole of or a part of the PHY ID can be notified. Then, by combining with information transmission by the sequence, a PHY ID of 3 bits~11 bits can be notified.

Also, as a concrete example for mapping a PHY ID into a radio resource, by defining a plurality of RE mapping patterns of a reference signal, the user apparatus UE selects a mapping pattern based on the PHY ID, so that the user apparatus UE can notify of the whole of or a part of the PHY ID. Also, by combining the above-mentioned sequence, Cyclic shift and OCC and the like with the RE mapping patterns, further more bit sequences can be notified. Also, an antenna port of a reference signal may be selected based on the PHY ID.

Although various ID generation methods and mapping methods have been described so far, it is not necessary that an ID generation method/mapping method used when a user apparatus UE transmits a signal is the same as an ID generation method/mapping method which is assumed when receiving a signal. For example, an operation may be performed in which, when transmitting a signal, a PHY ID is mapped to a reference signal so that the reference signal is transmitted, but when receiving a signal, a PHY ID is detected from PHY control information.

Also, although generation and mapping and the like of a destination PHY ID have been described so far, generation and mapping and the like of a PHY ID of a transmission source can be performed similarly to the generation and mapping and the like of the destination PHY ID.

(Configuration Example of the User Apparatus UE)

Figure 12:
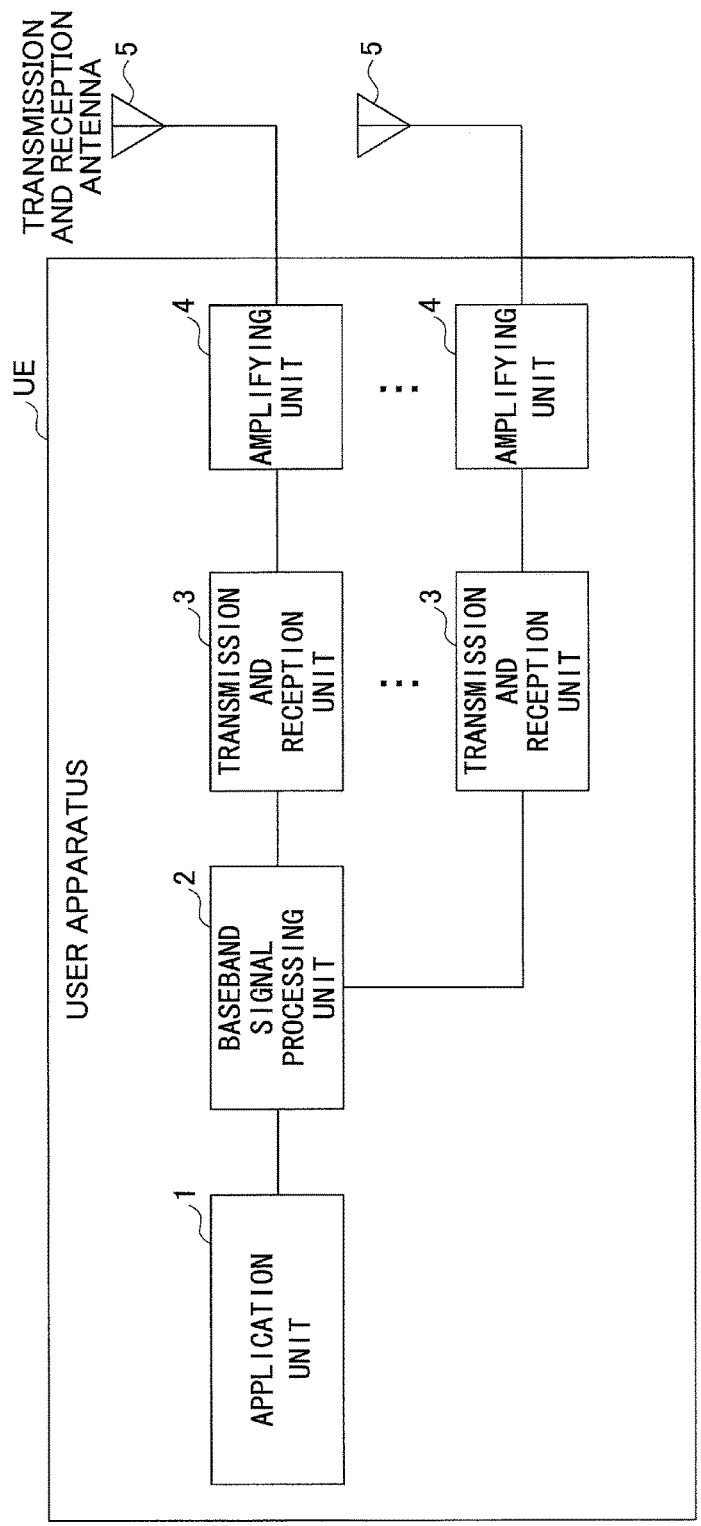
FIG. 12 is a diagram showing a block diagram of the user apparatus UE.

FIG. 12 shows a block diagram of the user apparatus UE of one or more embodiments of the present invention. As shown in FIG. 12, the user apparatus UE according to one or more embodiments includes an application unit 1, a baseband signal processing unit 2, a transmission and reception unit 3, an amplifying unit 4, and a transmission and reception antenna 5. The user apparatus UE according to one or more embodiments is a user apparatus UE that can perform operation complying with LTE, and can perform transmission and reception using a plurality of antennas. However, this is merely an example, and one or more embodiments of the present invention can be also applied to a user apparatus UE of which the number of antenna is one.

The application unit 1 is a functional unit corresponding to an application for performing voice communication and data communication between users utilizing D2D communication, for example. The baseband signal processing unit 2 performs generation and obtaining of various signals/data. The transmission and reception unit 3 performs modulation and demodulation and the like of a carrier. The amplifying unit 4 performs amplification of a signal, and the transmission and reception antenna 5 performs transmission and reception of electric waves. Processing according to one or more embodiments is performed by the baseband signal processing unit 2. Thus, the baseband signal processing unit 2 is described in more detail.

FIG. 13 shows a block diagram of the baseband signal processing unit 2. As shown in FIG. 13, the baseband signal processing unit 2 includes a PHY ID generation unit 201, a control unit 202, a reference signal/synchronization signal/discovery signal generation unit 203, a transmission control information generation unit 204, a transmission data generation unit 205, a mapping unit 206, a demapping unit 207, a channel estimation unit 208, a received control information decoding unit 209, a received data decoding unit 210, an ID decision unit 211, and a decision unit 212. An operation example of the baseband signal processing unit 2 is described below.

In the baseband signal processing unit 2, an upper layer ID is passed to the PHY ID generation unit 201 from the application unit 1, for example. The PHY ID generation unit 201 generates a PHY ID from the whole of or a part of the upper layer ID by the method described so far. The control unit 202 inserts the PHY ID generated by the PHY ID generation unit 201 into each physical channel. That is, as described before, in a case where the PHY ID is transmitted by a resource of a data channel, the control unit 202 passes the PHY ID to the transmission control information generation unit 204, so that the transmission control information generation unit 204 includes the PHY ID in the PHY control information (example: FIG. 10, FIG. 11 and the like). Also, in a case where the PHY ID is mapped to a reference signal, a synchronization signal, a discovery signal or the like, the control unit 202 passes the PHY ID to the reference signal/synchronization signal/discovery signal generation unit 203, so that the reference signal/synchronization signal/discovery signal generation unit 203 generates a reference signal of a sequence associated with the PHY ID and the mapping, for example. By the way, the PHY ID may be transmitted by PHY control information, as well as by the reference signal, the synchronization signal, the discovery signal or the like.

The transmission data generation unit 205 generates transmission data for mapping based on transmission data received from the application unit 1.

Information (example: bit sequence) generated by the reference signal/synchronization signal/discovery signal generation unit 203, the transmission control information generation unit 204, the transmission data generation unit 205 and the like is mapped to a radio resource by the mapping unit 206. The information mapped to the radio resource is transmitted by using the radio resource by the transmission and reception unit 3, the amplifying unit 4, and the transmission and reception antenna 5.

In operation of reception, the demapping unit 207 obtains a signal from each radio resource. The channel estimation unit 208 performs channel estimation by the reference signal. The channel estimation result is passed to the ID decision unit 211, the received control information decoding unit 209 and the received data decoding unit 210.

The received control information decoding unit 209 obtains control information from the signal demapped by the demapping unit 207, and also has a function for obtaining control information from a synchronization signal and a discovery signal. The received data decoding unit 210 obtains received data (payload).

The ID decision unit 211 decides whether the PHY ID of the user apparatus UE itself is received by the sequence of the received reference signal and the like and the mapping, or a control channel (PHY control information). When it is decided that the PHY ID of the user apparatus UE itself is received, the ID decision unit 211 once returns the ID decision result (result that PHY ID is received, and the like) to the received control information decoding unit 209 for filtering control information and data that the user apparatus UE should receive. The received control information decoding unit 209 that receives the ID decision result obtains control information addressed to the user apparatus UE itself, passes the control information to the received data decoding unit 210, so that the received data decoding unit 210 obtains received data addressed to the user apparatus UE according to the control information.

Although the ID decision unit 211 decides whether the PHY ID is received or not, as described before, since the PHY ID may be the whole of or a part of the upper layer ID, the ID decision unit may perform not only decision of the PHY ID but also decision of the upper layer ID. For example, in a case where the PHY ID is the same as the upper layer ID, the ID decision unit 211 regards detection of a PHY ID addressed to the user apparatus UE itself as detection of an upper layer ID addressed to the user apparatus UE itself, so that the ID decision unit 211 may pass the ID decision result (receiving the upper layer ID addressed to the user apparatus UE itself) to a processing unit (application unit 1 in this example) that performs processing of the upper layer. The decision unit 212 performs decision of ACK/NACK to instruct, for example, signal retransmission to the control unit 202.

The configuration of the user apparatus UE shown in FIG. 12 and FIG. 13 is merely an example. For example, the user apparatus may be configured as a user apparatus that performs D2D communication by radio, including: signal transmission unit that transmits a signal including a destination identifier of a physical layer associated with a destination identifier of an upper layer which is a layer higher than the physical layer; and signal reception unit that detects a signal addressed to the user apparatus by detecting an identifier, of the physical layer of the user apparatus, that is associated with an identifier of the upper layer of the user apparatus from a signal received by radio.

Accordingly, by transmitting and receiving an identifier of a physical layer that is associated with an identifier of an upper layer, the overhead amount can be suppressed. Also, since the user apparatus can quickly identify a signal addressed to the user apparatus by a received identifier of a physical layer, the signal can be received efficiently. According to one or more embodiments, an upper layer identifier and a physical layer identifier may not be associated with each other. That is, the physical layer identifier may be independently set irrespective of the upper layer identifier.

The destination identifier of the physical layer included in the signal transmitted by the signal transmission unit includes, for example, the whole of or a part of the destination identifier of the upper layer. According to this configuration, overhead related to transmission and reception of an identifier can be suppressed. The signal transmission unit can generate the destination identifier of the physical layer from the destination identifier of the upper layer. For example, the signal transmission unit can generate the destination identifier of the physical layer by applying a hash function to the destination identifier of the upper layer. Also, for example, the signal transmission unit can generate the destination identifier of the physical layer by omitting or shortening a specific segment in the destination identifier of the upper layer. According to these configurations, an identifier whose information amount is small can be generated while preventing collision as much as possible.

Also, the signal transmission unit may map the destination identifier of the physical layer to a predetermined control information area in a radio resource to transmit control information including the destination identifier as the signal. According to this configuration, when the receiving side detects control information addressed to the receiving side itself, the receiving side can efficiently receive data addressed to the receiving side itself by using the control information.

Also, the signal transmission unit may map the destination identifier of the physical layer to a reference signal, a synchronization signal or a discovery signal to transmit the reference signal, the synchronization signal or the discovery signal as the signal. According to this configuration, overhead can be reduced, and the signal addressed to the user apparatus itself can be efficiently detected.

The signal reception unit may detect data of the upper layer addressed to the user apparatus by using the identifier of the physical layer of the user apparatus as the whole of or a part of the identifier of the upper later of the user apparatus. According to this configuration, overhead can be reduced, and the signal addressed to the user apparatus itself can be efficiently detected.

Also, according to one or more embodiments, there is provided a signal transmission and reception method executed between user apparatuses that perform D2D communication by radio, including: a signal transmission step in which a transmission side user apparatus transmits a signal including an identifier, of a reception side user apparatus of a physical layer, associated with an identifier of the reception side user apparatus of an upper layer which is a layer higher than the physical layer; and a signal reception step in which the reception side user apparatus detects a signal addressed to the reception side user apparatus by detecting the identifier, of the physical layer of the reception side user apparatus, from a signal received by radio.

The user apparatus UE described according to one or more embodiments may include a CPU and a memory and may be realized by executing a program by the CPU (processor), or may be realized by hardware such as hardware circuits including logics of processing described according to one or more embodiments, or may be configured by coexistence of a program and hardware.

The base station described according to one or more embodiments may include a CPU and a memory and may be realized by executing a program by the CPU (processor), or may be realized by hardware such as hardware circuits including logics of processing described according to one or more embodiments, or may be configured by coexistence of a program and hardware.

In the above, embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE has been explained by using a functional block diagram. However, such an apparatus may be implemented in hardware, software, or a combination thereof. The software that operates according to one or more embodiments of the present invention by a processor provided in the user apparatus UE may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiments and is intended to include various variations, modifications, alterations, substitutions and so on without departing from the spirit of the present invention. Accordingly, the scope of the invention should be limited only by the attached claims.

The present international patent application claims priority based on Japanese patent application No. 2014-059258, filed in the JPO on Mar. 20, 2014, and the entire contents of the Japanese patent application No. 2014-059258 are incorporated herein by reference.

DESCRIPTION OF REFERENCE SIGNS

UE user apparatus
eNB base station
1 application unit
2 baseband signal processing unit
3 transmission and reception unit
4 amplifying unit
5 transmission and reception antenna
201 PHY ID generation unit
202 control unit
203 reference signal/synchronization signal/discovery signal generation unit
204 transmission control information generation unit
205 transmission data generation unit
206 mapping unit
207 demapping unit
208 channel estimation unit
209 received control information decoding unit
210 received data decoding unit
211 ID decision unit
212 decision unit

The invention claimed is:

1. A user apparatus that performs D2D communication by radio, comprising:
a transmitter that transmits a signal including a destination identifier of a physical layer associated with a destination identifier of an upper layer which is a layer higher than the physical layer; and
a receiver that detects a signal addressed to the user apparatus by detecting an identifier, of the physical layer of the user apparatus, that is associated with an identifier of the upper layer of the user apparatus from a signal received by radio,
wherein the receiver detects data of the upper layer addressed to the user apparatus by using the identifier of the physical layer of the user apparatus as a part of the identifier of the upper layer of the user apparatus.

2. The user apparatus as claimed in claim 1, wherein the destination identifier of the physical layer included in the signal transmitted by the transmitter includes the whole of or a part of the destination identifier of the upper layer.

3. The user apparatus as claimed in claim 2, wherein the transmitter generates the destination identifier of the physical layer from the destination identifier of the upper layer.

4. The user apparatus as claimed in claim 2, wherein the transmitter maps the destination identifier of the physical layer to a predetermined control information area in a radio resource to transmit control information including the destination identifier as the signal.

5. The user apparatus as claimed in claim 2, wherein the transmitter maps the destination identifier of the physical layer to a reference signal, a synchronization signal or a discovery signal to transmit the reference signal, the synchronization signal or the discovery signal as the signal.

6. The user apparatus as claimed in claim 1, wherein the transmitter generates the destination identifier of the physical layer from the destination identifier of the upper layer.

7. The user apparatus as claimed in claim 6, wherein the transmitter generates the destination identifier of the physical layer by applying a hash function to the destination identifier of the upper layer.

8. The user apparatus as claimed in claim 7, wherein the transmitter generates the destination identifier of the physical layer by omitting or shortening a specific segment in the destination identifier of the upper layer.

9. The user apparatus as claimed in claim 7, wherein the transmitter maps the destination identifier of the physical layer to a predetermined control information area in a radio resource to transmit control information including the destination identifier as the signal.

10. The user apparatus as claimed in claim 7, wherein the transmitter maps the destination identifier of the physical layer to a reference signal, a synchronization signal or a discovery signal to transmit the reference signal, the synchronization signal or the discovery signal as the signal.

11. The user apparatus as claimed in claim 6, wherein the transmitter generates the destination identifier of the physical layer by omitting or shortening a specific segment in the destination identifier of the upper layer.

12. The user apparatus as claimed in claim 6, wherein the transmitter maps the destination identifier of the physical layer to a predetermined control information area in a radio resource to transmit control information including the destination identifier as the signal.

13. The user apparatus as claimed in claim 6, wherein the transmitter maps the destination identifier of the physical layer to a reference signal, a synchronization signal or a discovery signal to transmit the reference signal, the synchronization signal or the discovery signal as the signal.

14. The user apparatus as claimed in claim 1, wherein the transmitter maps the destination identifier of the physical layer to a predetermined control information area in a radio resource to transmit control information including the destination identifier as the signal.

15. The user apparatus as claimed in claim 1, wherein the transmitter maps the destination identifier of the physical layer to a reference signal, a synchronization signal or a discovery signal to transmit the reference signal, the synchronization signal or the discovery signal.

16. A signal transmission and reception method executed between user apparatuses that perform D2D communication by radio, comprising:
transmitting, from a transmission side user apparatus, a signal including an identifier, of a reception side user apparatus of a physical layer, associated with an identifier of the reception side user apparatus of an upper layer which is a layer higher than the physical layer; and
detecting, by the reception side user apparatus, a signal addressed to the reception side user apparatus by detecting the identifier, of the physical layer of the reception side user apparatus, from a signal received by radio, wherein the reception side user apparatus detects data of the upper layer addressed to the reception side user apparatus by using the identifier of the physical layer of the reception side user apparatus as a part of the identifier of the upper layer of the reception side user apparatus.

* * * * *